(12) United States Patent
Marshall et al.

(10) Patent No.: US 7,530,889 B2
(45) Date of Patent: May 12, 2009

(54) COMMON HVAC DOORS (75) Inventors: Steven B. Marshall, Oxford, MI (US); Earl H. Buckman, Warren, MI (US); Kevin B. Horne, Orion, MI (US); David S. Newman, Lake Orion, MI (US); Robert W. Oliver, Howell, MI (US)

(73) Assignee: Valeo Climate Control Corp., Auburn Hills, MI (US)

( * ) Notice: Subject to any disclaimer, the term of this patent is extended or adjusted under 35 U.S.C. 154(b) by 0 days.

(21) Appl. No.: 11/239,994

(22) Filed: Sep. 30, 2005

(65) Prior Publication Data

US 2007/0077879 A1    Apr. 5, 2007

(51) Int. Cl.
*F24F 7/00* (2006.01)

(52) U.S. Cl. ...................... 454/121; 454/139

(58) Field of Classification Search .......... 454/121, 454/139
See application file for complete search history.

(56) References Cited

U.S. PATENT DOCUMENTS

| | | | |
|---|---|---|---|
| 2,182,716 A * | 12/1939 | Brent | 454/145 |
| 5,228,475 A | 7/1993 | Trill | |
| 5,885,152 A * | 3/1999 | Wardlaw | 454/121 |
| 6,113,483 A * | 9/2000 | Schambre et al. | 454/121 |
| 6,609,389 B2 * | 8/2003 | Ozeki et al. | 62/244 |
| 6,772,833 B2 * | 8/2004 | Auer et al. | 165/203 |
| 6,886,630 B2 | 5/2005 | Onda et al. | |
| 6,942,564 B1 | 9/2005 | Roland et al. | |
| 2004/0014418 A1 * | 1/2004 | Farag et al. | 454/156 |

* cited by examiner

*Primary Examiner*—Steven B McAllister
*Assistant Examiner*—Samantha A Miller
(74) *Attorney, Agent, or Firm*—Dierker & Associates, P.C.

(57) ABSTRACT

The present invention relates to arrangement of devices, and, in particular doors, in the architecture of HVAC units.

Where space is a consideration, having doors that are common and/or that can be used or nested in a common operative space, reduce the need of inventory of different parts, and allow for use of smaller interior HVAC space volumes in HVAC units.

12 Claims, 8 Drawing Sheets

COMMON HVAC DOORS

FIELD OF THE INVENTION

The present invention relates to the field of heating and air conditioning, and, particularly, to automotive heating and/or air conditioning systems.

BACKGROUND OF THE INVENTION

Heating and air conditioning systems have often been limited in their efficiencies due to numerous constraints placed on them due to either their placement location or the energy constraints related to conditioned air production. The general designs of heating and air conditioning or HVAC systems normally have various component parts arranged in units. For example, an HVAC system, generally having an HVAC unit through which an air flow or air flows which are heated, ventilated and conditioned prior to distribution as conditioned air, is provided. The general layout or design of HVAC units is usually dictated by space or packaging concerns, often defined by the end consumer or distributor; HVAC core component size which is required for the desired performance characteristics; overall architectural logic; vehicle interfaces, for example, coolant, refrigerant, electrical and duct requirements; and door component number and size.

BRIEF SUMMARY OF THE INVENTION

Aspects of the present invention relate to HVAC units and the use of doors for diversion, direction or distribution of air or air flows or the like, and choices that must be made between various diversion, direction or distribution devices often known as 'doors' or 'flaps'. Such choices are not apparent, due to the flexibility and numerous designs, both new and available, of different systems for obtaining the ultimate mixes and distributions of air or air flows prior to presenting the conditioned area to the exterior of the HVAC unit of an HVAC system. In most automotive applications, for example, the HVAC unit or units, utilized to provide the conditioned air where eventually desired outside of the HVAC unit, may need a plurality of flaps or doors or other such means to control air distribution and temperature. These doors or flaps are invariably different shapes and sizes relative to one another and from one vehicle to the next.

The present invention, in its various aspects, makes the doors or flaps (referred hereinafter collectively as 'doors') common within one HVAC unit design. In the current state of the art, a single door design is rarely used in more than one place in an HVAC assembly due to design constraints such as shape requirements, the packaging environment, and drive type mechanisms. By providing, for example, a door type that is the same or that, when positioned in an opposite location, is a mirror image or the like, a 'common door' yields an improved HVAC unit with respect to cost, quality, JIT, manufacturing and assembly. The present invention, in various aspects, provides for a 'commonality', that allows for a tight packaging space use and orients common doors in a way that leads to providing a functional HVAC unit in terms of achieving the desired characteristics for the consumer and eventual end consumer (such as noise and power consumption constraints). All of this can substantially be done, at decreased cost and with ease of manufacture.

DETAILED DESCRIPTION OF THE PRESENT INVENTION

Aspects of the present invention provide for common doors for economies of scale and better space packaging or the need for less space or more compact units, with consequently larger cross sections for the airflow. Such advantages lead to lower air velocities, with lower turbulence stemming from the lower velocities and reduction in flow noise, which in preferred aspects of the present invention lead to distinct advantages over non-common door or non-common operative space HVAC unit configurations.

A common door is used in aspects of the present invention, particularly in automotive HVAC applications. In preferred embodiments of the common door, it is possible to use common doors interchangeably, (e.g. one can flip or turn the orientation of one door to be 180° opposite of another door orientation within the HVAC unit), and it is possible to use such doors, with door ends that have the same or different end features, in multiple locations in automotive HVAC applications. In preferred aspects of the present invention, at least one door is used which has end features to attach and/or drive the door. For example, a door may have a drive mechanism attached as an end feature on one of the sides of the door and another end feature on the other side of the door. Likewise, a door may have a fixing mechanism on one side of the door and another end feature on the other side of the door. In preferred aspects of the present invention, a drive mechanism such as an actuator is attached to either side of the door in such a way that it is reversible (or can be seen as a mirror type image) in the assembly, meaning that the same type of door (common door) may be positioned with the drive mechanism facing, for example, either the right interior side or the left interior of the HVAC unit, depending on where it is located in the HVAC unit. The common door can be orientated such that the proper drive mechanism is utilized wherever it is placed in the HVAC unit because at least one end has the appropriate end feature to provide the function required at that orientation. The preferred aspects of the present invention, by using the same configuration or common door in more than one location in the HVAC unit, lead to cost savings in production tooling and ease of assembly benefits.

With preferred aspects of the present invention, a common door is located, in one or in more than one location as required. Such a common door, in typical HVAC systems, can be easily used in one or more different locations, depending upon the needs for air direction and/or mixing required prior to distribution outside of the HVAC unit. By employing the same or common door in more than one location and/or orientation in the HVAC unit, tooling cost savings ensue. In addition, time is saved at the point of assembly of the HVAC unit, since only one type of common door is used and, unlike multiple or different door designs, common doors do not have to be sorted and organized prior to being assembled in their required positions.

The present invention, in its various aspects, utilizes at least two doors to direct, deflect, divert or distribute air or air flows. In preferred embodiments, the at least two doors are common in at least one way, preferably in at least two ways—they provide for a common design, and/or they fit within a common or the same operative space. By same or common operative space it is meant the space that usually would be largely occupied, normally, by one door and where one door normally performs one of the functions described herein. Unlike the prior art doors, the present invention provides for doors which function in approximately the same operating space, so that they function, therefore, in conjunction with one another.

The present invention, in various aspects, provides for a broader number of architectures to be used in the HVAC unit and for the overall HVAC system. Unlike the standard doors of the prior art, which are limited in a finite sense due to their architectures as to how they might function, the HVAC units of the present invention, having doors that are common and/or doors that overlap or are integrated in common (in the same functional space), allow for arrangements of doors within a given packaging space not known heretofore. In the aspects of the present invention with doors in common, the flexibility lost in other designs due to the need for such designs to be laid out differently due to use of multiple designs of doors in multiple locations within the HVAC architecture, is overcome. The doors of preferred aspects of the present invention, of common size and shape, can function in a more limited space, and, therefore, provide for more overall architectural designs and lower cost, while providing equivalent functionalities. In addition, the commonality of the doors in terms of the end features at the ends of the door, (which, when comparing two doors, can be either exactly the same, or mirror images of one another), allows for use of the functionally equivalent or common door in various areas of the HVAC unit, together or even separately within the unit, with the same advantages that use of the same door gives in the manufacture of an HVAC unit.

The aspects of the present invention, therefore, help utilize limited space more effectively and even, more aerodynamically, and can therefore assist a manufacturer or supplier in meeting the needs of the end user, (for example, the automaker with limited space for HVAC systems), to reach its goal of providing heating and air conditioning performance in spite of strict physical space limitations.

The present invention, in various aspects, improves the ability to package a plurality of doors into an HVAC architecture, in addition to allow for positioning of the doors within a common operative space within the HVAC architecture to effectively increase, and allow for maintenance of, excellent airflow characteristics. By providing for more than one door in a common operative space, and, preferably, more than one common door in a common operative space, these aspects of the present invention reduce concerns over the trade-offs between tight packaging space architectures and optimizing performance and allow larger cross sections of flow versus other placements or positioning of doors. At a specified air flow, the larger cross sections of the common doors, and, especially, common doors in series, keep air velocities down, which in turn keeps turbulence and related noise to a minimum. These aspects of the present invention allow doors to be physically larger than those packaged in a similar sized architecture not employing the placement of at least one door in at least one other door, and preferably, the doors are common doors. The present invention aspects also allow more than one door to be placed within the same angular range (or alpha) of the door. As disclosed above, by employing common doors, economies of scale and improved quality factors (that come with reduction of part numbers,) the architecture is more desirable to the customer or end consumer. By providing for nesting doors, and, especially, common nesting doors, crooked panel cold pathways, (e.g. air pathways formed at various angles due to the need for space between the doors in previous HVAC designs) are avoided.

Referring now to the drawing, in an embodiment, a first HVAC unit barrel door is placed in a common operative area or space of a second HVAC barrel door, and preferably, common or identical or mirror configured door. By passing within the bounds of the second HVAC barrel door, the first HVAC barrel door provides for additional air guidance function without taking up additional space within an HVAC unit. In aspects of the present invention, the outer sealing regions of the first door 17 pass within or are 'nested' within the axis of rotation of the second door (10). The nesting of common (identical or mirror configured doors is possible due to the shape of the door (they tessellate within each other).

Preferred aspects of the present invention, therefore, allow wider or bigger doors to exist and pass through one another in a common space (common operative space) which would normally be impossible with un-nested doors of such large size. Various aspects of the present invention allow a fixed-size door to be packaged within another common door so the overall space the doors take in an HVAC unit is reduced relative to a two-door configuration with no common operative space. It is to be understood that in this application, common door means doors that are substantially identical, identical or configured to mirror a shape or features of the other door. These aspects allow for a larger number of larger doors in less space, meaning lower air flow velocities, lower turbulence, and lower pressure drop between the entrance and exit of the doors and reduced noise level versus non-common operative space door HVAC units. Embodiments of a common door, as in aspects of the present invention, can have end features typically comprising one female drive mechanism on one end and one gear teeth mechanism on the opposite end, thus allowing multiple drive mechanism designs to be utilized in the HVAC unit.

Common doors can be any shape such as a "flag" or "barrel" or other shape that provides an appropriate door function in an HVAC unit in the various aspects of the present invention. The end features can be fixing mechanisms of any similar type such as female or male shapes, or gear teeth or other shapes in the various aspects of the present invention, or drive mechanisms, or can be end features that are combined with any other appropriate drive mechanisms such as motors, levers, linkages, etc. to cause movement of the common door around its appropriate axis and in the orientation desired. Preferred are common doors with different end features on either end of each common door.

FIGS. 1-4 describe embodiments of the present invention wherein the barrel doors include axis bosses (20) and/or circular segment ends (19) that tessellate or fit within one another. This allows larger radius barrel doors to fit in a space (41) which would normally be overcrowded with such large sized doors (10, 17). The sides (19, 40) have a geometry that allows the doors to nest within one another. The effective radius (41') of each of the doors is thus larger than in a pair of doors separately (not shown). No support shaft is necessary along the bearing axis for the common doors to function within the common operative space.

Figure 1:
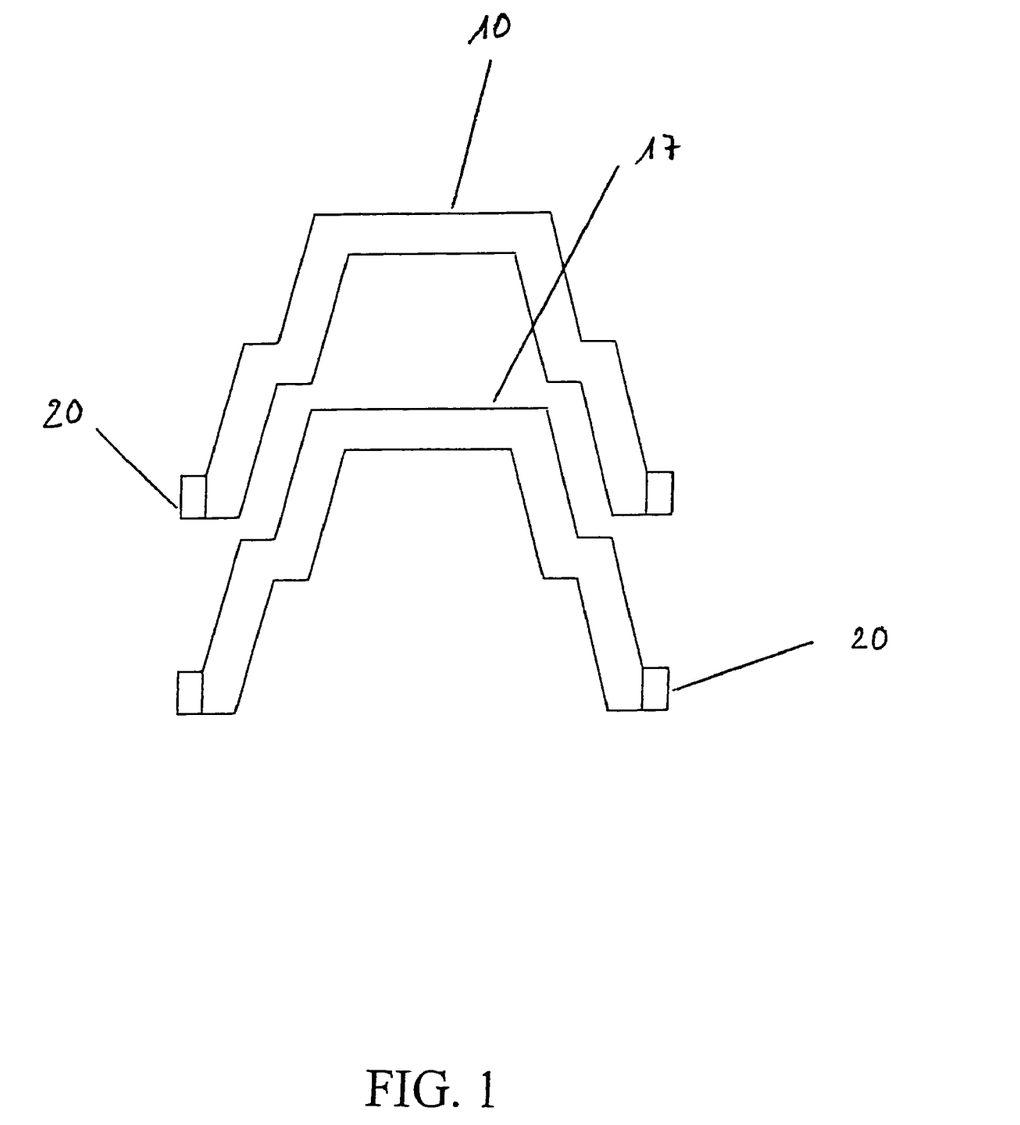
FIG. 1 is a schematic cross sectional view of two doors nested in accordance with an aspect of the present invention.
Figure 2:
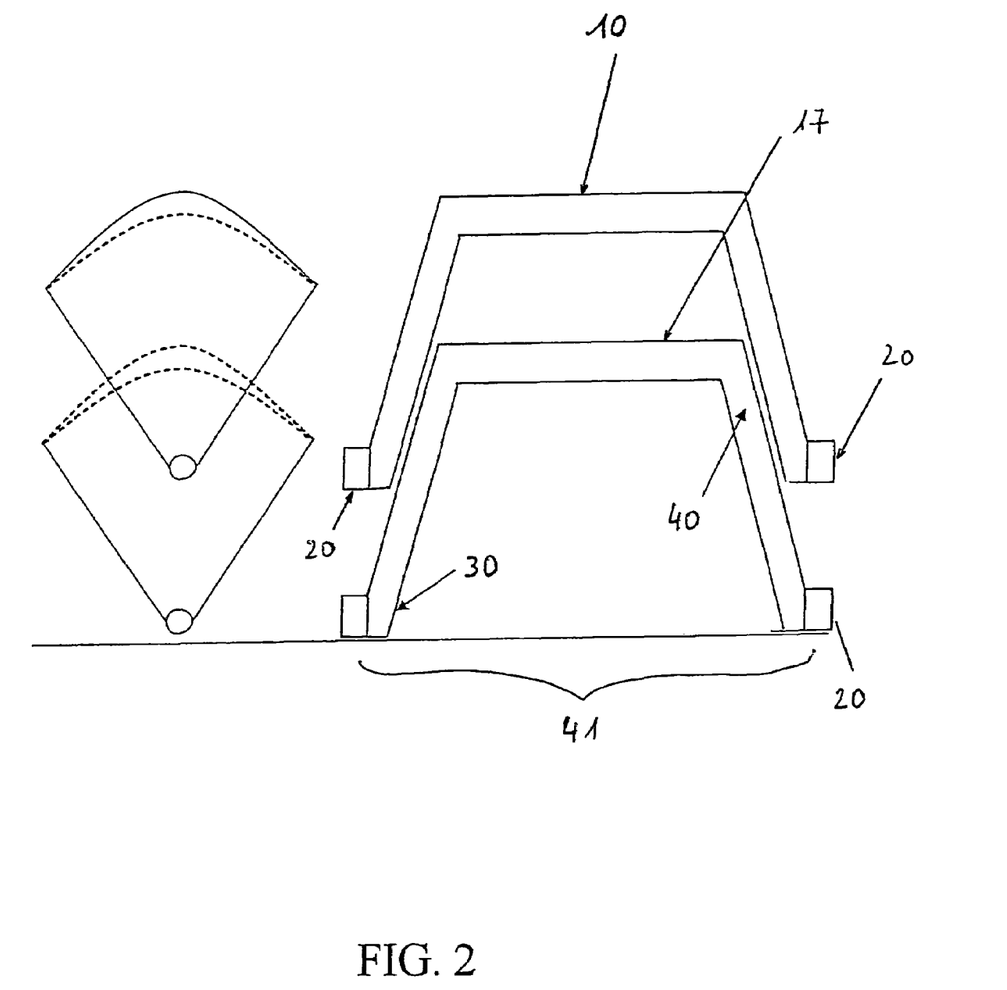
FIG. 2 is a schematic cross sectional view and corresponding lateral view of two doors occupying the same common operative space, in accordance with an aspect of the present invention.
Figure 3:
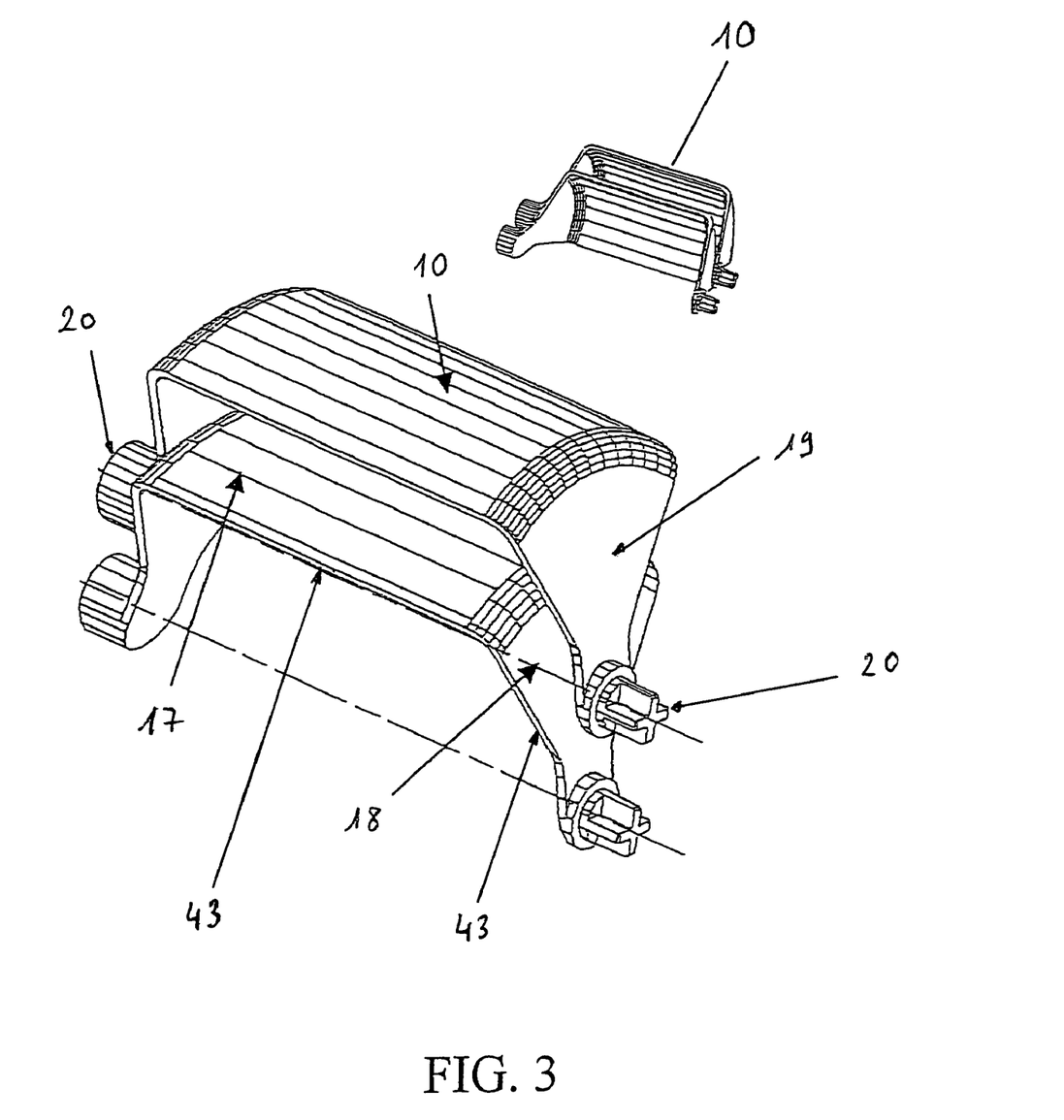
FIG. 3 is a two-schematic view, one from above and one interior view, of two HVAC doors in a common operative space, in accordance with an aspect of the present invention.
Figure 4:
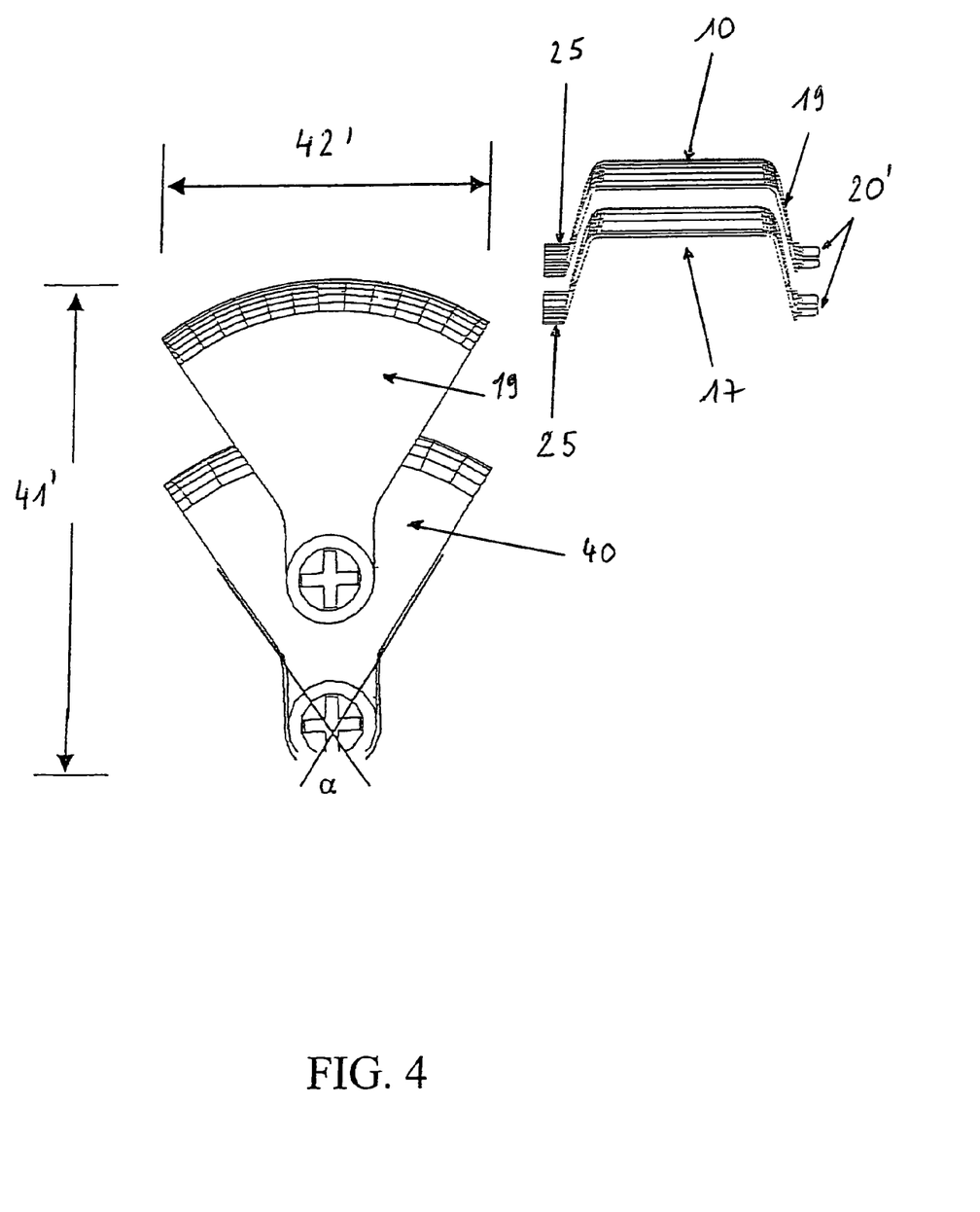
FIG. 4 is a front and a side schematic view of HVAC common doors having different end features on opposite ends and kinematic angular travel, the angle of a the common doors, in accordance with an aspect of the present invention.

FIGS. 3 and 4 show placement of the doors such that the tessellation of the barrel doors is such that the first door (17) could swing or pass within the second door (10). The door (10) is a typical barrel door with two opposed circular segment ends (19). The opposed ends (19) are tapered or canted such that the outer sealing surfaces (43) of the first door (17) can pass within the two axis bosses (20, 25) of the second door (10). These doors are preferably of a common design. The chord (42') of the barrel part of the door (10, 17) can be larger than a normal barrel door (prior art) (not shown), because the radius is not as limited by packaging space between one door and another.

In preferred aspects of the present invention, the at least two doors nest to some extent, allowing more capability for packaging (less use of space). The doors can be aligned in a straight line or otherwise, preferably in a straight line configuration.

The figures show isometric views of aspects of the present invention with respect to two barrel type doors nesting or tessellating within one another. As described above, the doors, in a common operative space spatial arrangement, take up less space and have a large door radius capability.

In the figures which show side views of the current invention with respect to barrel type doors, doors nesting or tessellating in one another are illustrated. The arrangement of doors of these aspects of the present invention not only take up less space than other arrangements, but have larger door radii and chord capacity (See FIG. 4). The larger cross sections (chord) (42'), give rise to lower velocities leading to lower turbulence/pressure drop/noise. The doors have the same kinematical angular travel, α.

Simple schematics herein show further aspects on side view and a frontal view of two doors in a 'nesting' or tessellating orientation. The nesting allows one door to grossly pass through the rotational axis of another preferably common door. This allows the two doors to take up less space, be more compact, be common and allow more flexible HVAC architectures to exist.

Additional schematics demonstrate shapes of the doors as a non-limitative example of nesting or tessellation. In preferred embodiments of the present invention, wherein at least one door is within the space occupying the interior of another door, the doors can be, specifically, tessellating doors and be common doors. The shape of the sides of the doors is planar, concave, convex or a function which allows manufacture, flow performance and nesting or tessellation to ensue. In various aspects of the present invention, the sealing surfaces of one of the doors are outside of the swing of the other door, to allow tooling to be achieved. However, in other non-limiting aspects of the present invention, separate parts or elements of the HVAC unit, such as a removable mixing baffles or separate 'heater core' towers, or the like, could have features molded to allow sealing even though the door seals within the bounds of the sealing of another other door. In preferred aspects of the present invention, the sealing surfaces are spatially outside the sweep of the other door.

Figure 5:
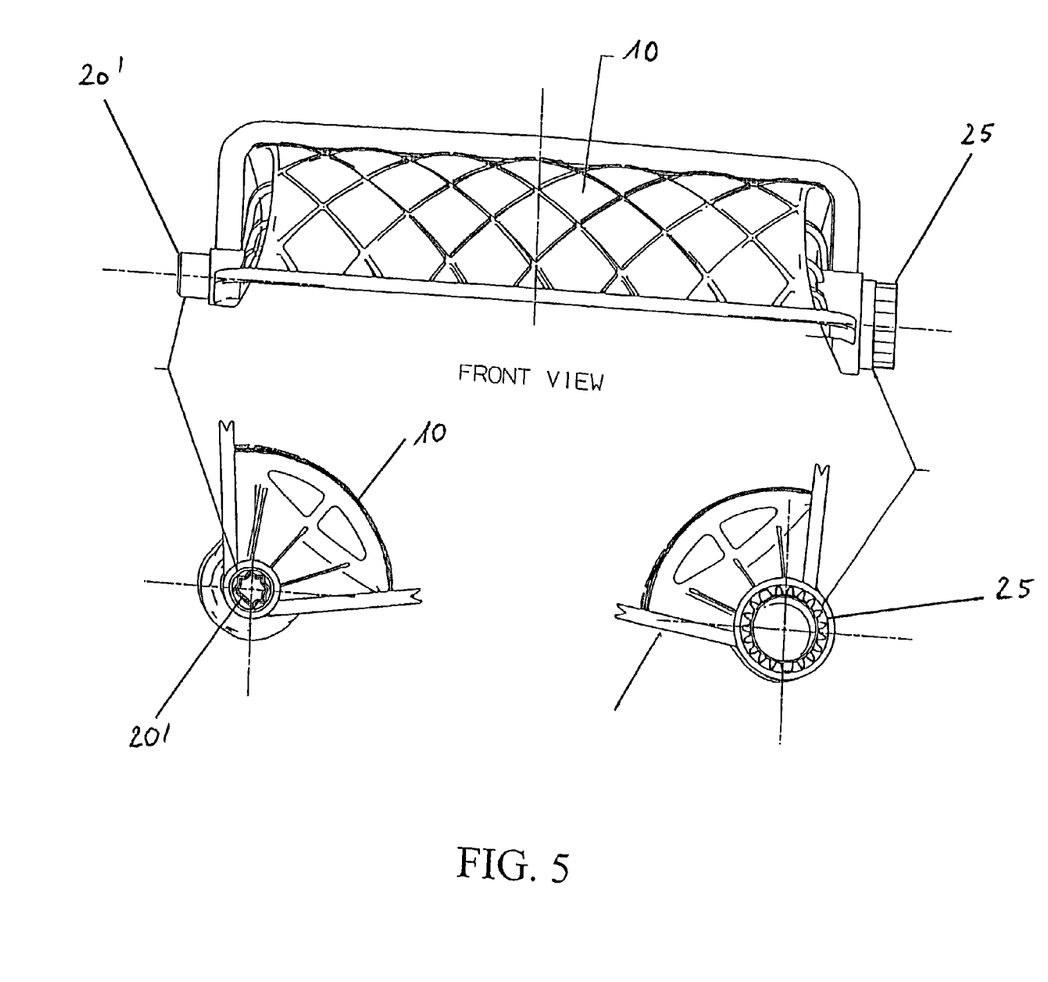
FIG. 5 is a front view and two opposite side views of an HVAC barrel door with different end features, that can be oriented as necessary due to these different features in various areas of the HVAC unit, in accordance with an aspect of the present invention.
Figure 6:
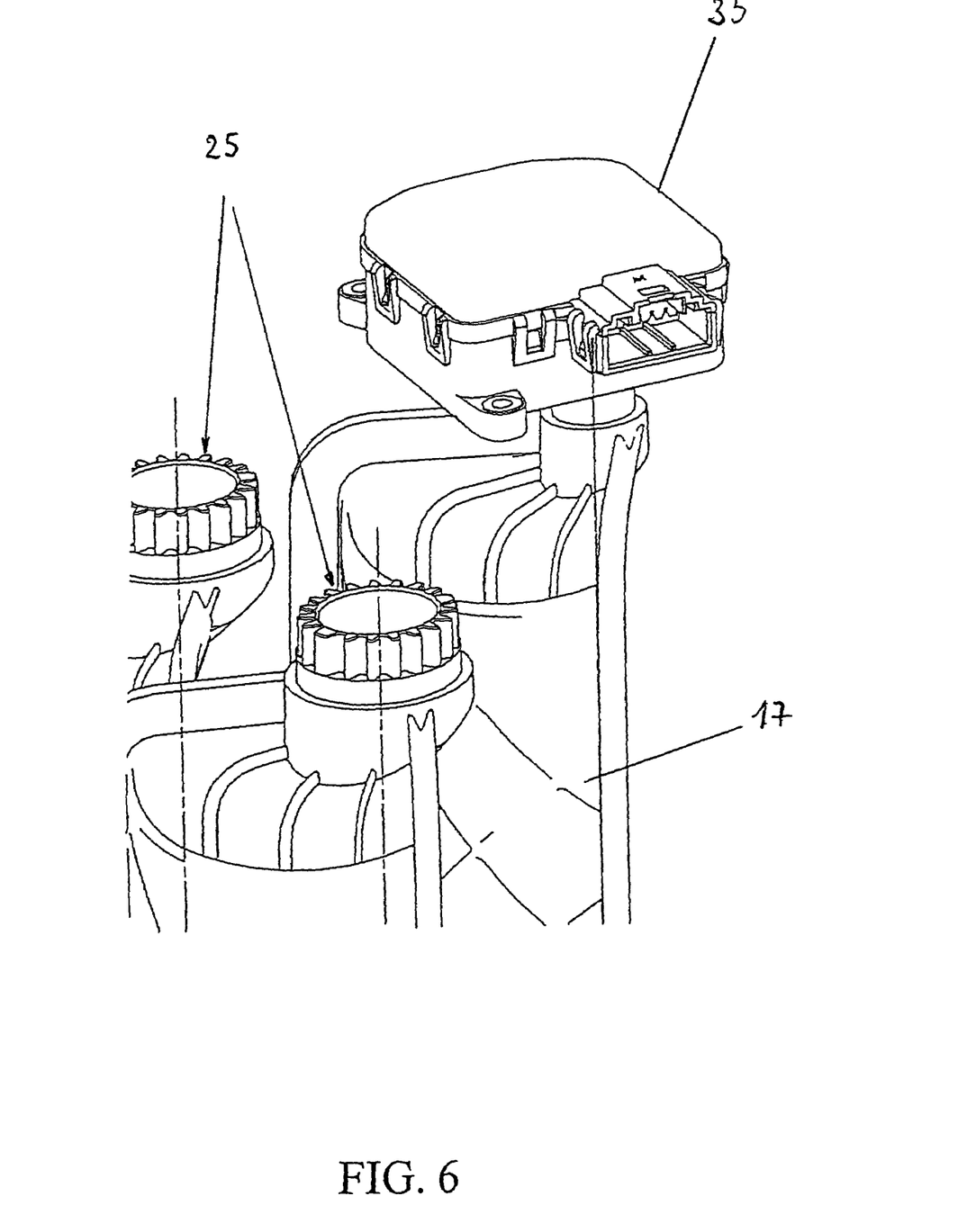
FIG. 6 is a schematic drawing showing common doors having two different end features, one feature having gear teeth, in accordance with an aspect of the present invention.
Figure 7:
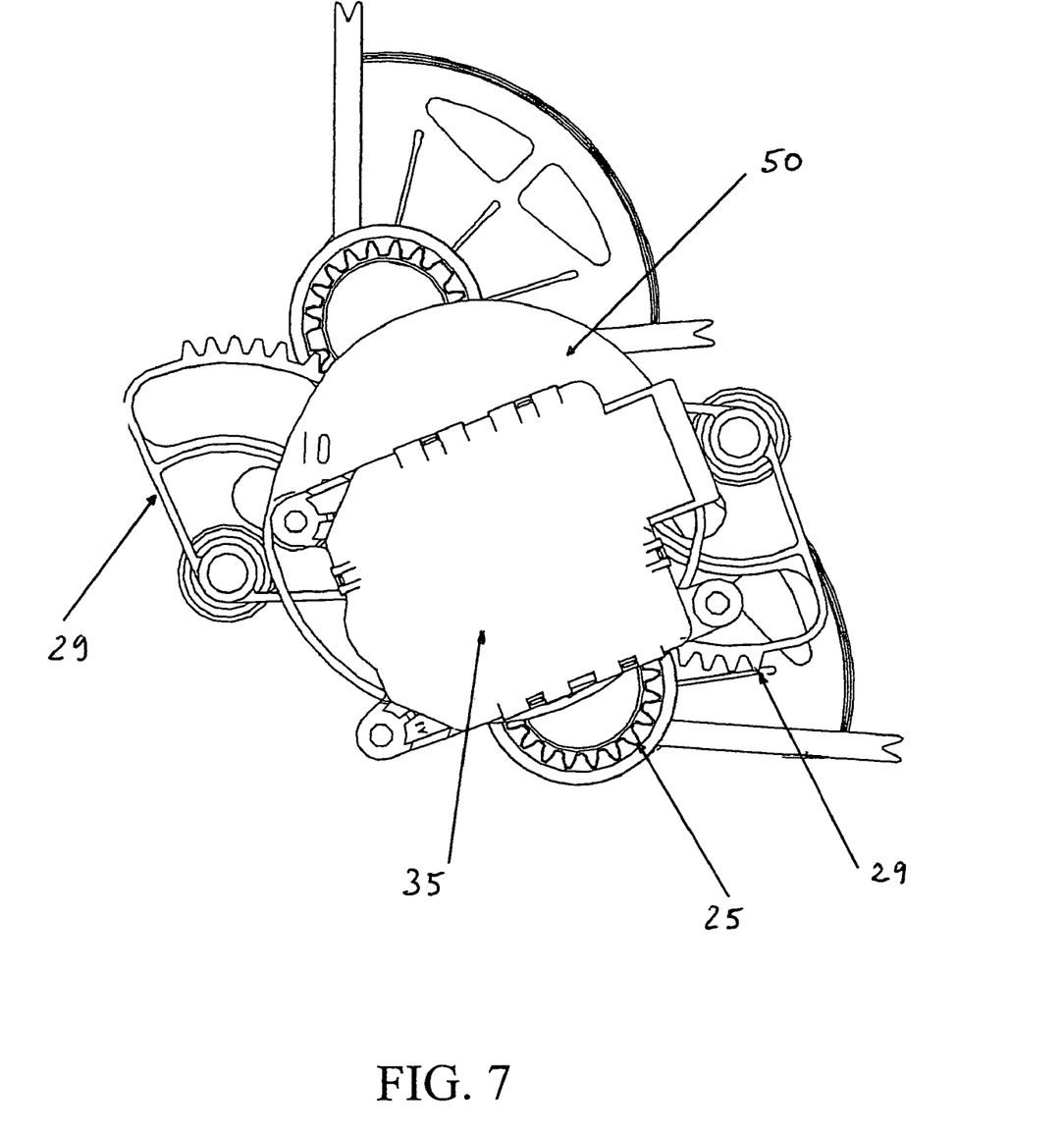
FIG. 7 is a schematic showing common doors and an actuator mechanism for moving the doors, in accordance with an aspect of the present invention.

In preferred embodiments of the present invention, the common door has a bearing, and, preferably, a larger diameter bearing with a drive mechanism; in particular, an end feature drive mechanism desired in that particular HVAC unit design. Referring to FIGS. 5-7 is shown a door (10) with a mechanism comprising a gear with gear teeth (25) on one end that is driven by gear sectors (29), and preferably driven from a single cam (50), a motor (35), and a smaller diameter bearing on the other end with a completely different type of drive mechanism (20), preferably, for example, a female star shape end feature (20') to accept a drive motor (35). By providing for a common door with two different end features, and in particular, two different drive interfaces, one on each end, the common door can be used in HVAC units requiring more than one drive interface.

Figure 8:
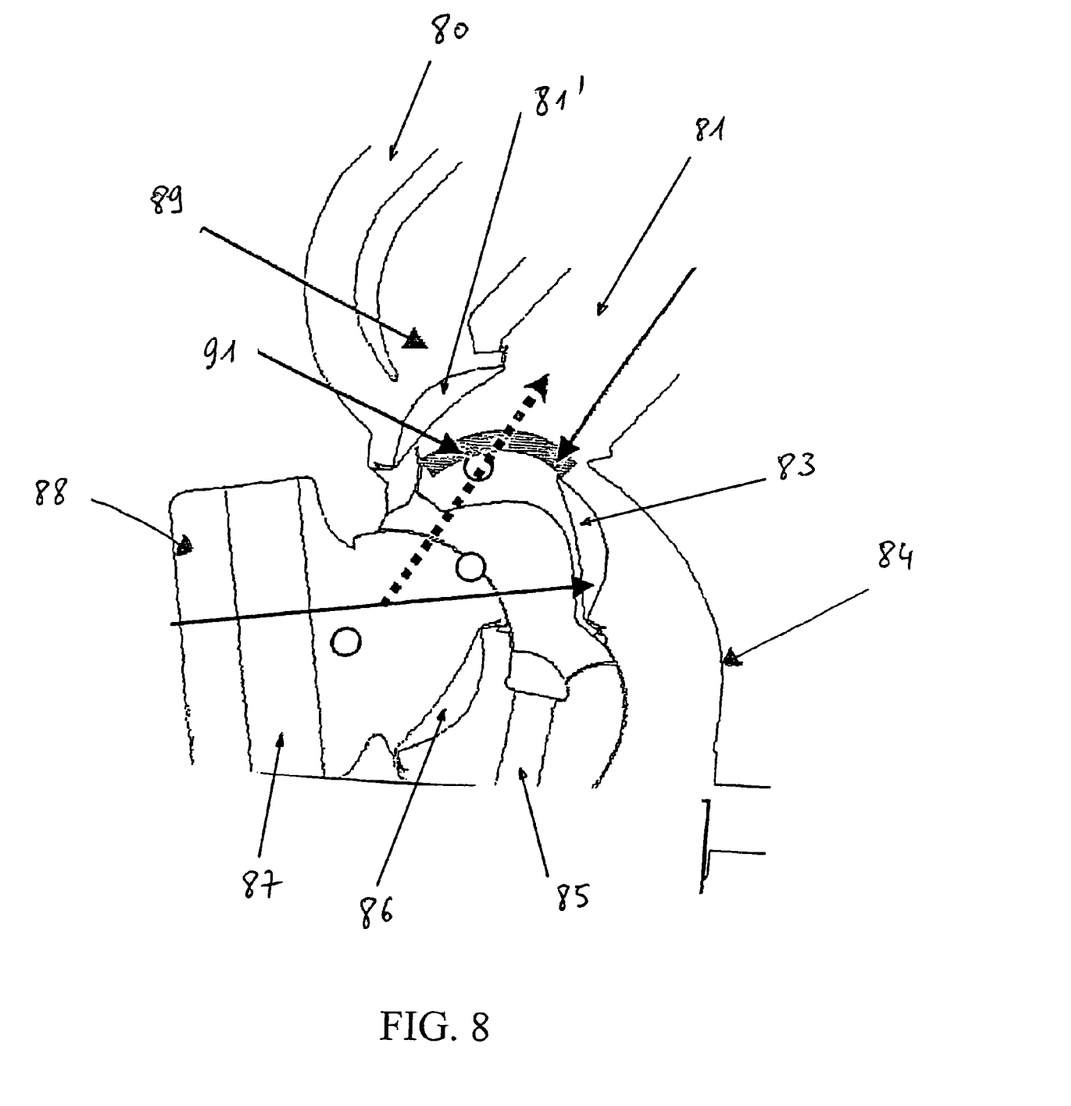
FIG. 8 is a schematic cross sectional view of an HVAC unit having doors that slide, in accordance with an aspect of the present invention.

FIG. 8 is an illustration an HVAC unit having a demist duct (80), panel duct (81), panel door (81'), floor door (83), floor duct (84), heater core (85), blend door (86), evaporator (87), area of flow feed from blower (88), and defrost duct (89). Nested doors (91) having mechanisms (not illustrated) are located in the same operative space.

Unless stated otherwise, dimensions and geometries of the various structures depicted herein are not intended to be restrictive of the invention, and other dimensions or geometries are possible. Plural structural components can be provided by a single integrated structure. Alternatively, a single integrated structure might be divided into separate plural components. In addition, while a feature of the present invention may have been described in the context of only one of the illustrated embodiments, such feature may be combined with one or more other features of other embodiments, for any given application. It will also be appreciated from the above that the fabrication of the unique structures herein and the operation thereof also constitute methods in accordance with the present invention.

The preferred embodiment of the present invention has been disclosed. A person of ordinary skill in the art would realize however, that certain modifications would come within the teachings of this invention. Therefore, the following claims should be studied to determine the true scope and content of the invention.

What is claimed is:

1. An HVAC system, comprising:
   a. an HVAC unit;
   b. at least one air inlet and one air outlet duct to the HVAC unit; and
   c. at least two air diversion, direction, distribution or air mixing doors, each door including an outer sealing surface and opposed ends, the opposed ends each of which are tapered or canted and each having an axis boss disposed thereon wherein the outer sealing surface of a first door can pass within the two axis bosses of a second door;
   wherein the at least two doors are barrel doors, each barrel door including a barrel part and two opposite ends, the opposite ends being shaped like circular segments, each door rotatable about a rotational axis parallel to and spaced apart from the rotational axis of the other door;
   and wherein the at least two barrel doors are nested so that the barrel part of a first barrel door is placed substantially completely within a space defined by the barrel part, two opposite ends and axis of rotation of a second barrel door such that the barrel part of the first barrel door selectively swings or passes on the first barrel door's axis of rotation out of, into and through the space defined by the barrel part, two opposite ends and axis of rotation of the second barrel door.

2. The HVAC system as in claim 1 wherein the at least two doors are identical to each other or mirror images of each other.

3. The HVAC system as in claim 1 wherein the at least two doors have a common operative space, and the doors are positioned within the common operative space in the HVAC unit.

4. The HVAC system as in claim 3 wherein the at least two doors are common doors.

5. The HVAC system as in claim 1 wherein conditioned air flows across each of the at least two doors in series.

6. An HVAC unit, comprising:
   a. a housing;
   b. at least two common doors; and
   c. at least one air inlet and one air outlet duct to the HVAC unit;
   wherein each of the at least two common doors is a barrel door including a barrel part and two opposite ends, the opposite ends being shaped like circular segments, each door rotatable about a rotational axis parallel to and spaced apart from the rotational axis of the other door;
   wherein the at least two common doors are nested in a common operative space;
   and wherein the at least two common doors are nested so that the barrel part of a first common door is placed substantially completely within a space defined by the barrel part, two opposite ends and axis of rotation of a second common door such that the barrel part of the first common door selectively swings or passes on the first common door's axis of rotation out of, into and through the space defined by the barrel part, two opposite ends and axis of rotation of the second common door.

7. The HVAC unit as in claim 6 wherein each common door has an end feature.

8. The HVAC unit as in claim 7 wherein the end feature on one end of each common door is different from the end feature on the other end of each respective common door.

9. The HVAC unit as in claim 8 wherein the at least two common doors are identical to each other or mirror images of each other, and wherein the at least two common doors are nested such that, when nested, the end feature on one end of one of the at least one common doors is identical and on the same side as that of the other at least one common door.

10. The HVAC unit as in claim 8 wherein at one end feature on one end of one of the at least one common doors is a gear or drive mechanism.

11. The HVAC unit as in claim 8 further comprising kinematics for moving doors wherein at least one end feature on one end of one of the at least common doors is a shape which interfaces with the kinematics or the housing.

12. The HVAC unit as in claim 8 wherein at one end feature on one end of the one of the at least one common doors is a gear sector, and the end feature on the other end of the at least one of the at least one common doors is other than a gear sector.

\* \* \* \* \*